May 26, 1942.  O. L. WOOD, JR  2,284,465

SHAFT PACKING

Filed Nov. 25, 1940  2 Sheets-Sheet 1

Inventor:
Orla L. Wood, Jr,
by Harry E. Dunham
His Attorney.

May 26, 1942.     O. L. WOOD, JR     2,284,465
SHAFT PACKING
Filed Nov. 25, 1940     2 Sheets-Sheet 2

Inventor:
Orla L. Wood, Jr,
by Harry E. Dunham
His Attorney.

Patented May 26, 1942

2,284,465

UNITED STATES PATENT OFFICE 2,284,465

SHAFT PACKING

Oria L. Wood, Jr., Schenectady, N. Y., assignor to General Electric Company, a corporation of New York Application November 25, 1940, Serial No. 367,078

15 Claims. (Cl. 286—9)

The present invention relates to shaft packings to reduce leakage between a shaft or like rotatable element and a casing or like stationary element. More specifically, the invention relates to packings in which the seal is effected by a liquid of the general type disclosed in the Patent No. 2,133,879, issued October 18, 1938, to E. L. Thearle and assigned to the same assignee as the present application.

In packings of this kind a vane or like element projects into a groove formed by a ring or cup element. Liquid is continuously supplied to the groove and forced along the groove during rotation of a horizontal shaft to which one of the elements is secured. Such packings effect a complete seal as long as the shaft is rotated, for example, in case the packing forms part of a turbine the turbine shaft is sealed to the turbine casing during operation of the turbine. In certain instances, such as in the case of mercury turbines, it is desirable to seal the shaft to the casing also during standstill of the turbine in order to prevent leakage of air from the atmosphere into the turbine which upon subsequent operation would effect undesirable oxidation of the mercury.

The object of my invention is to provide an improved packing arrangement whereby a horizontally disposed shaft or like rotatable element may be effectively sealed to a casing during standstill of the shaft or stationary element as well as while the shaft is rotated. This is accomplished in accordance with my invention by the provision of means forming a liquid seal between an element secured to the shaft and a normally stationary element rotatably supported on the casing and the provision of other means for rotating the second element upon standstill of the shaft. The means for rotating the other element may be any suitable power agency such as an elastic fluid turbine wheel to which such other element is secured or an electric motor.

For a better understanding of what I believe to be novel and my invention, attention is directed to the following description and the claims appended thereto in connection with the accompanying drawings.

Figure 1:
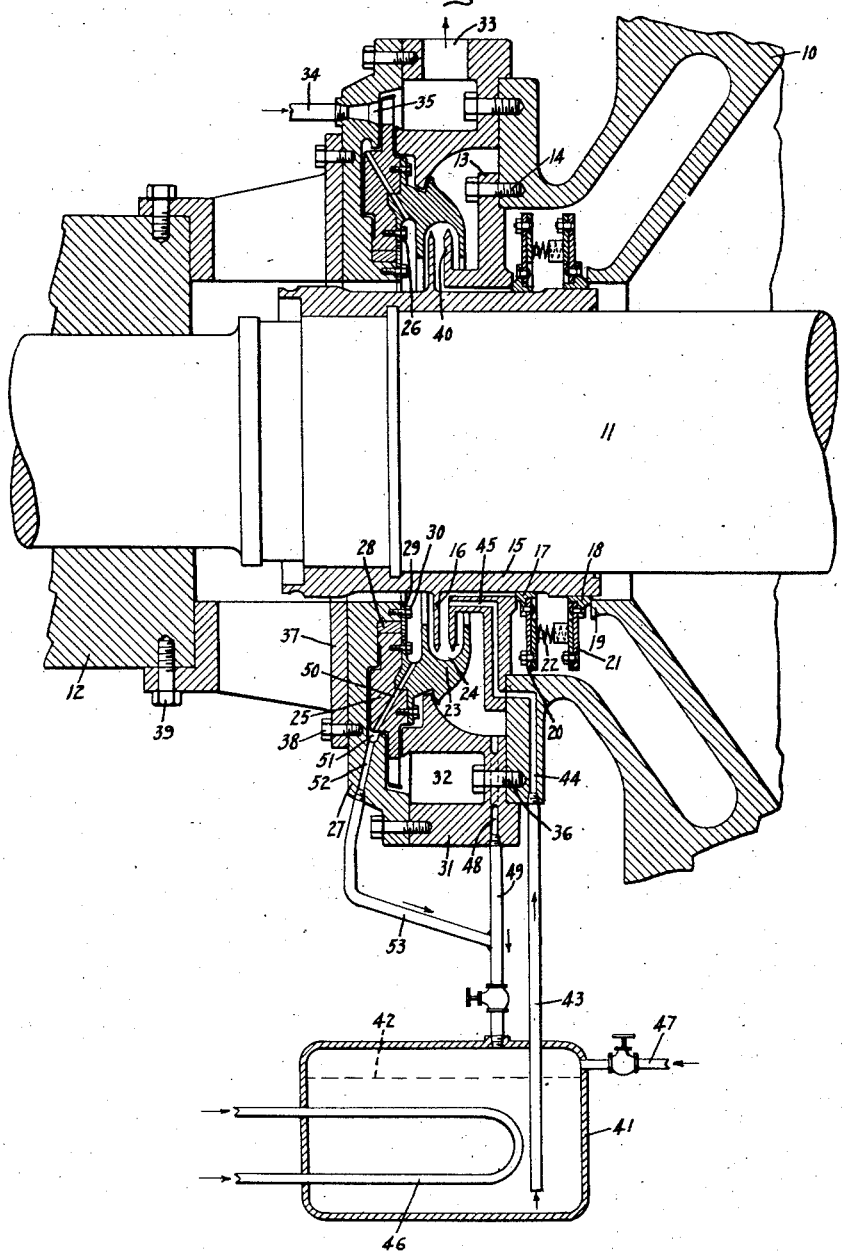
Figure 2:
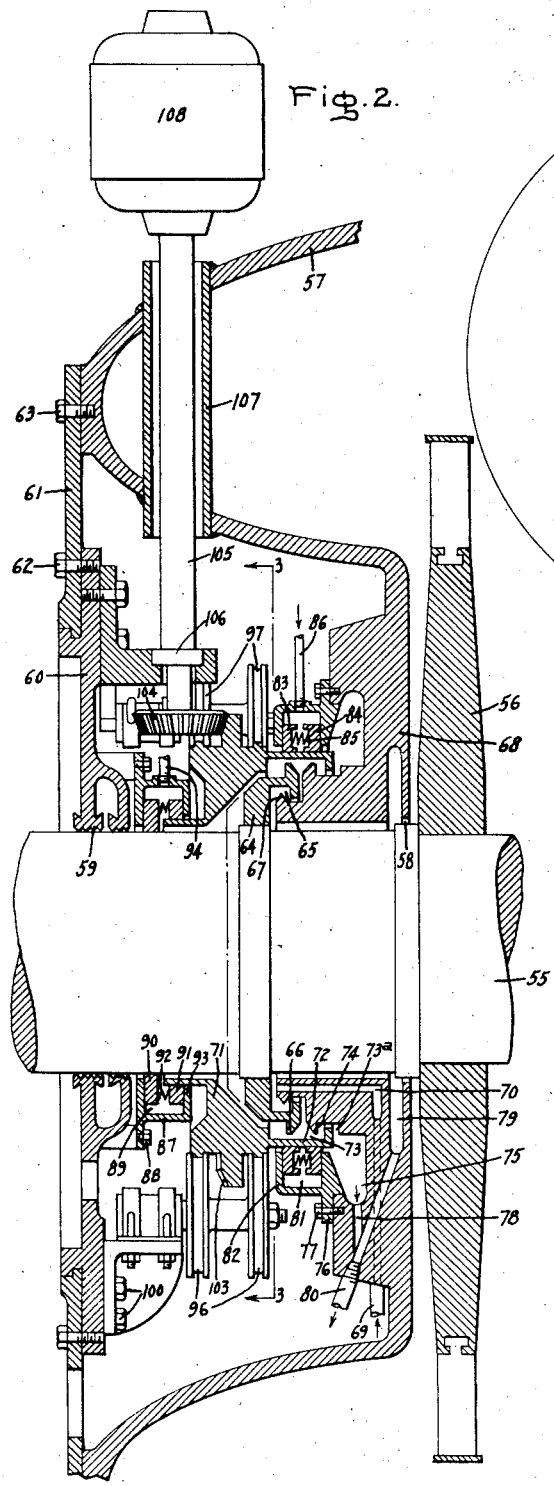
Figure 3:
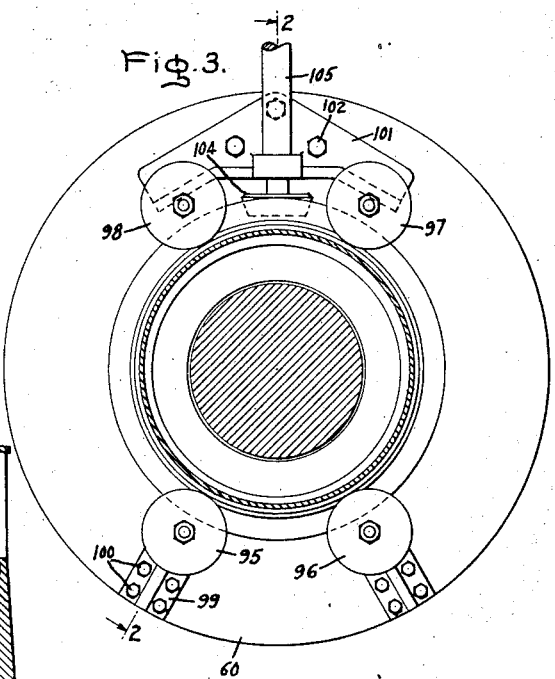

In the drawings Fig. 1 illustrates an elastic fluid turbine arrangement embodying my invention; Fig. 2 shows a modification in accordance with my invention; and Fig. 3 is a section along line 3—3 of Fig. 2.

The arrangement shown in Fig. 1 comprises an elastic fluid turbine for operation with mercury vapor having a casing 10 forming an opening and a turbine rotor having a shaft 11 projecting through the opening and supported on a bearing 12. The casing portion shown in the drawing is at the exhaust or vacuum end. The packing for sealing the shaft to the turbine casing to prevent leakage of air from the atmosphere into the turbine comprises a ring 13 secured to an end flange of the casing 10 by a plurality of bolts 14. A runner or rotatable packing element 15 is secured to the shaft 11 and forms a vane 16. Two axially spaced cast iron packing rings 17 and 18 have a minimum running clearance, that is sealing engagement with the runner 15 are biased axially towards the ring 13 and a shoulder 19 formed by the casing 10. To this end rings 20 and 21 are riveted to the sealing rings 17 and 18 respectively and biased in opposite directions by means including a plurality of circumferentially spaced springs 22 engaging and suitably supported on opposite sides of the rings 20 and 21. Thus, the ring 17 is biased into sealing engagement with the ring 13 and the ring 18 is biased into sealing engagement with the shoulder 19 to reduce leakage along the runner.

One part of the liquid sealing means is formed by the runner 15 with the vane 16 and the other part of the liquid sealing means comprises a ring or cup element 23 forming a groove 24 into which the vane 16 projects. The ring or cup element 23 according to my invention is rotatably supported. In the present example, the element 23 is secured to an auxiliary turbine wheel 25 by means of a plurality of bolts 26. The turbine wheel in turn is supported on a packing casing 27 through the intermediary of a bearing 28 held in position on the packing casing by a ring 29 secured to the packing casing by bolts 30. The packing casing 27 has an outer portion 31 which forms an exhaust chamber 32 with an outlet 33 for receiving fluid exhausted from the turbine wheel 25. Operating fluid which may be mercury vapor or compressed air in case of a mercury vapor turbine is conducted to the turbine wheel 25 by an inlet conduit 34 and a plurality of nozzle passages 35 formed in the packing casing 27. The exhaust casing 31 which also constitutes part of the packing casing is secured to the main turbine casing 10 by a plurality of bolts 36 and the packing casing 27 is also supported on a ring 37 by bolts 38. The ring 37 in turn is held on the bearing 12 by bolts 39. The stationary part of the liquid seal also includes a vane 40 formed by a lateral extension or projection of the ring 13 and having end portions located within the groove 24 of the ring or cup element 23. Liquid such as mercury is continuously conducted to the groove 24 from a source, in the present instance indicated as a tank 41, for containing mercury 42. The mercury liquid is forced from the tank 41 to the groove 24 through a conduit 43 connected to a channel 44 in the turbine casing 10, which channel communicates with another channel 45 through the ring 13 and the vane 40. A cooling element 46 is disposed within the tank 41 for cooling the mercury therein. The flow of mercury from the tank to the sealing groove may be effected by the supply of gas, such as nitrogen under pressure, to the vapor space in the tank 41 by means including a valved conduit 47.

During operation, mercury is continuously conducted to the groove 24 and forced around or along the groove to effect a complete liquid seal between the vanes 16 and 40 on one hand and the ring 23 on the other hand by rotation of the shaft or the turbine wheel 25. While both elements may be rotated at the same time, it is more economical to maintain the ring 23 at rest during rotation of the shaft. Upon standstill of the shaft, that is, when the turbine is shut down, however, the ring 23 is rotated by conducting operating fluid through the conduit 34 to the turbine wheel 25 to effect rotation of the latter and of the ring 23. Mercury liquid discharged from the groove 24 over the righthand end of the ring 23 is returned to the tank 41 through a channel 48 formed in the casing 31 and a valved conduit 49 connecting the channel 48 to the tank 41. Likewise, mercury liquid discharged from the lefthand side of the groove 24 is returned to the tank 41 through a plurality of channels 50 partly formed in the ring 23 and partly in the bucket wheel 25. The sealing liquid is discharged from the channels 50 into an annular groove 51 which communicates at its lower end with a channel 52 formed in the casing 27 and connected by a conduit 53 to the aforementioned return conduit 49.

The modification according to my invention as shown in Figs. 2 and 3 comprises a mercury turbine having a rotatable member or rotor with a shaft 55 and a last stage bucket wheel 56 enclosed by a turbine casing 57 having an opening 58 through which the shaft 55 projects. The packing arrangement for sealing the shaft 55 to the casing 57 includes a labyrinth type packing 59 having a casing 60 supported on the turbine casing 57 by means of a ring 61 and a plurality of bolts 62 and 63. The labyrinth type packing 59 is provided on the outer or atmospheric side of the packing arrangement and primarily serves to prevent oil from an adjacent shaft bearing (not shown) from entering the packing. The latter in addition includes a liquid seal type packing arrangement formed by means including a ring or runner 64 secured to the shaft 55 and forming an inner annular groove 65 and an outer projection or vane 66. The groove 65 is arranged to cooperate with a vane 67 projecting into the groove and formed on an end portion 68 of the casing 57. Sealing liquid such as mercury is conducted to the groove 65 of the ring or runner 64 through a conduit 69 connected to a channel 70 formed in the casing end portion 68.

During operation of the turbine, rotation of the shaft 55 and the runner 64 forces the mercury liquid supplied to the lower portion of the groove 65 along this groove to form a liquid seal between the runner 64 and the vane 67, thereby forming a liquid seal between the interior of the turbine and the atmosphere. The ring or runner 64 is arranged in cooperative relation with another packing element in the form of a ring 71 concentrically arranged with and spaced from the shaft 55 and the ring 64. The ring 71 has a lateral projection 72 forming an inner annular groove 73 facing the shaft. The aforementioned vane 66 of the ring 64 and another vane or annular projection 74 formed on the casing end portion 68 project into the groove 73. The righthand end wall of the projection 72 is concentrically arranged with and projects into a groove 73a of the casing end portion 68.

During rotation of the shaft 55 and the runner 64, sealing liquid, in the present instance mercury, is discharged from the groove 65 into the groove 73. Rotation of the runner 64 forces the liquid along the groove 73 to form a second liquid seal between the vanes 66 and 74 in groove 73. Thus, during operation of the turbine, two liquid seals arranged in series as regards the flow of leakage are formed to prevent leakage between the interior of the turbine and the atmosphere, one liquid seal being formed between the runner 64 and the vane 67 in the groove 65 and the other liquid seal being formed between the vane 66 of the runner 64 and the vane 74 of the casing end portion 68 and the projection 72 of the ring 71.

During operation, mercury liquid flowing from the first sealing groove 65 into the second sealing groove 73 is discharged from the latter into an annular chamber or groove 75 formed by the casing end portion 68 and a ring 76 secured to the casing end portion 68 by a plurality of bolts 77. Mercury is drained from the chamber 75 through a drain channel 78 formed in the lower part of the casing end portion 68. The opening 58 of the turbine casing forms an annular groove 79 on the vacuum side of the packing from which leakage of mercury is discharged through a drain channel 80 communicating with a lower portion of the groove 79.

In order to reduce leakage between the annular chamber 75 and the atmosphere, a sealing chamber 81 is formed by a projection 82 of the ring 76. Two carbon packing rings 83 and 84 are disposed within the chamber 81 and axially biased away from each other into sealing engagement with the projection 82 and the ring 76 by means of a plurality of springs 85 between the rings 83, 84 to prevent leakage of mercury vapor from the chamber 75 and of air from the atmosphere into the chamber 81. The chamber is filled with a gas at a pressure slightly above that of the atmosphere. Non-oxidizing gas, such as nitrogen, is conducted to the chamber by means of a conduit 86. With this arrangement nitrogen or similar sealing gas flows from the chamber 81 along the packing ring 84 into the chamber 75 and along the packing ring 83 into the atmosphere.

A similar sealing arrangement is formed between the ring 71 and the shaft 55. The shaft is surrounded by a ring 87 supported on the packing casing 60 by means including a plurality of bolts 88 and forming a packing chamber 89. Two carbon type packing rings 90 and 91 are disposed within the chamber 89 and biased apart by means of a plurality of springs 92 engaging adjacent sides of the rings. Packing ring 90 has sealing engagement with the shaft 55 and is biased towards the lefthand wall of the chamber 89 while the ring 91 has sealing engagement with a projection 93 and the ring 71 and is biased towards the righthand wall of the chamber 89. Gas, such as nitrogen, is conducted to the chamber 89 by means of a conduit 94 at a pressure slightly above that of the atmosphere. During operation, sealing gas flows along the inner sealing surface of the ring 90 towards atmosphere, thus preventing air from entering the chamber 89, and sealing gas also flows along the inner sealing surface of the ring 91 towards the atmosphere, thus preventing leakage of air through the chamber 89 to the sealing groove 73.

In order to permit sealing of the turbine casing to the shaft while the turbine is out of operation, that is, during standstill of the turbine shaft, means are provided for rotatably supporting and rotating the ring 71. The supporting means includes four pairs of rollers 95, 96, 97 and 98 which broadly constitute a roller bearing. The lower rollers 95 and 96 have shafts supported on brackets 99 secured to the packing casing 60 by bolts 100. The upper pairs of rollers 97 and 98 are supported on a common bracket 101 held on the packing casing 60 by bolts 102.

Whereas in the arrangement of Fig. 1 the ring or cup element 23 is driven by an auxiliary turbine, in the present arrangement the corresponding ring element 71 is driven by an electric motor through a gearing. To this end the ring 71 is provided with a beveled gear 103 integrally formed with the ring and meshing with another beveled gear 104 secured to a shaft 105. The shaft 105 is supported by a bearing 106 held on the aforementioned bracket 101. The shaft projects through a channel member 107 passing through and fused to the exhaust end of the turbine casing 57. The shaft is driven at its upper end by an electric motor 108.

As the turbine is put out of operation the motor 108 is started to effect rotation of the ring 71. With the ring 64 at rest, mercury supplied to the lower end of the groove 65 flows over into the groove 73 formed by the projection 72 of the ring 71. Rotation of the ring 71 forces the mercury along the groove 73 to effect a liquid seal between the projection 72 and the vanes 67 and 74. Mercury is discharged from the groove 73 into the annular chamber 75, whence it is drained through the channel 76, as described above.

Thus, with the present arrangement a single liquid seal is formed upon rotation of the ring 71 during standstill of the shaft 55, whereas a double seal is formed during rotation of the shaft 55.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. The combination with a turbine casing having an opening and a rotatable shaft projecting through the opening, of a packing arrangement for sealing the shaft to the casing, said packing arrangement comprising an element forming a groove, another element forming a vane concentric with and projecting into the groove, both elements surrounding the shaft, one of the elements being secured and sealed to the shaft, means for rotatably supporting the other element on the casing, means for rotating the other element, and means for conducting liquid to the groove to effect a liquid seal between the two elements during rotation of either of them.

2. The combination of a rotary shaft member, a stationary turbine casing member having an opening through which the rotary member projects, a first element secured to such rotary member, a second element concentrically arranged with the first element, means for rotatably supporting the second element, means for rotating the second element, one of the elements forming an annular groove, the other element having a vane projecting into the groove, and means for conducting sealing liquid to the groove to form a liquid seal between the two elements during rotation of either of them.

3. Packing arrangement for sealing a turbine casing having an opening and a rotary shaft member projecting through the opening comprising a first and a second element, means for rigidly securing the first element to the shaft, means for rotatably supporting the second element on such casing, means for rotating the second element, one of the elements forming a groove facing the shaft, the other element having a vane concentrically arranged with and projecting into the groove, and means for conducting sealing liquid to the groove to form an annular seal between the two elements during rotation of either of them.

4. Packing arrangement for sealing a turbine casing having an opening and a rotary shaft member projecting through the opening comprising a first and a second element, means for rigidly securing the first element to the shaft, means for rotatably supporting the second element on such casing, means for rotating the second element, one of the elements forming a groove facing the shaft, the other element having a vane concentrically arranged with and projecting into the groove, means fastened to the casing and forming another vane projecting into the groove, and means for conducting sealing liquid to the groove to form an annular seal between the two elements during rotation of either of them.

5. The combination of a turbine casing having an opening, a rotatable shaft member projecting through the opening, a first and a second element having portions concentrically arranged with each other, one of the elements forming a groove, the other element forming a vane projecting into the groove, means for rigidly securing the first element to such rotatable member, means for conducting sealing liquid to the groove whereby a liquid seal is formed between the two elements during rotation of the rotatable member, and means for rotating the second element to form a liquid seal between the two elements while the rotatable member is at rest.

6. The combination with a turbine casing having an opening and a shaft projecting through the opening, of a packing arrangement for sealing the shaft to the casing comprising a first and a second element concentrically arranged with the shaft, one of the elements forming an annular groove, the other element having a vane projecting into the groove, means rigidly securing one of the elements to the shaft, and means for rotatably supporting and rotating the other element comprising an auxiliary turbine wheel secured to the other element and a bearing for rotatably supporting the turbine wheel.

7. The combination with a turbine casing having an opening and a horizontally disposed shaft projecting through the opening, of a packing arrangement for sealing the shaft to the casing during rotation of the shaft as well as while the shaft is at rest, said packing arrangement comprising an element forming an annular groove concentrically spaced from and facing the shaft, a runner fastened to the shaft and having a vane projecting into the groove, a ring secured to the casing and having a vane adjacent the other vane and projecting into the groove, means for conducting sealing liquid to the groove whereby a liquid seal is formed between the vanes and the element during rotation of the shaft, and means for rotating the element to form a liquid seal between it and the vanes while the shaft is at rest.

8. The combination with a turbine casing having an opening and a shaft projecting through the opening, of a packing arrangement for sealing the shaft to the casing during rotation of the shaft as well as while the shaft is at rest, said packing arrangement comprising a rotatable element forming an annular groove concentrically spaced from and facing the shaft, a runner fastened to the shaft and having a first vane projecting into the groove, a ring secured to the casing and having a second vane adjacent the first vane projecting into the groove, means including a channel through the second vane for conducting sealing liquid to the groove to form a liquid seal between the vanes and the element during rotation of the shaft, and means including a motor for rotating the element to form a liquid seal between the element and the vanes while the shaft is at rest.

9. The combination with a main mercury turbine having a casing with an opening and a horizontally disposed shaft projecting through the opening, of a packing arrangement for sealing the shaft to the casing both during operation and shutdown periods, said packing arrangement comprising a runner with a vane secured to the shaft, another vane secured to the casing, an element having a groove concentrically spaced with and facing the shaft, said vanes projecting into the groove, means for conducting mercury liquid to the groove to form a liquid seal between the vanes and the element during rotation of the shaft, and an auxiliary elastic fluid turbine including a bucket wheel supporting the element for rotating said element during standstill of the shaft to form a liquid seal between the vanes and the element while the main turbine is out of operation.

10. The combination with a turbine casing having an opening and a shaft projecting through the opening, of a packing arrangement for sealing the shaft to the casing, said packing arrangement comprising a first element secured to the shaft, a second element cooperatively arranged with the first element, one of the elements forming a groove facing the shaft, the other element having a vane projecting into the groove, means for conducting sealing liquid to the groove, means rotatably supporting the second element, and means including a motor driven gearing for rotating the second element while the shaft is at rest.

11. The combination with a turbine casing having an opening and a shaft projecting through the opening, of a packing arrangement for sealing the shaft to the casing, said packing arrangement comprising a runner secured to the shaft and having a vane, an element concentrically surrounding the shaft and forming a groove for receiving the vane, means for conducting sealing liquid to the groove, means including a plurality of rollers supporting the element, and means including a motor driven gearing for rotating the element while the shaft is at rest.

12. The combination with a turbine casing having an opening and a shaft projecting through the opening, of a packing arrangement for sealing the shaft to the casing, said packing arrangement comprising a runner secured to the shaft, a member fastened to the casing and forming a groove facing away from the shaft, a vane on said runner projecting into said groove, an element concentrically spaced with the shaft and forming a groove facing the shaft, another vane formed on the runner projecting into the last mentioned groove, means for conducting sealing liquid to said grooves to form liquid seals between the vanes and said member and said element, and means for rotating said element while the shaft is at rest to form a liquid seal between the runner and said element.

13. The combination with a casing having an opening and a shaft projecting through the opening, of a packing arrangement for sealing the shaft to the casing, said packing arrangement comprising a runner secured to the shaft, a member fastened to the casing and forming a groove facing away from the shaft, a vane on said runner projecting into said groove, an element concentrically spaced with the shaft and forming a groove facing the shaft, another vane formed on the runner projecting into the last mentioned groove, means for conducting sealing liquid to said grooves to form liquid seals between the vanes, said member and said element, and means for rotating said element while the shaft is at rest to form a liquid seal between the runner and said element, said last named means comprising a plurality of pairs of rollers supported on the casing for rotatably supporting the element and a motor driven gearing including a gear formed on said element.

14. The combination with a stationary turbine casing having an opening and a rotatable shaft member horizontally disposed and projecting through the opening, of a rotary liquid sealing arrangement for sealing the rotatable member to the casing while the rotatable member is at rest, said arrangement including a ring having an inner groove, means sealing the ring to the casing, means for rotating the ring while said rotatable member is at rest, a vane member sealed to the shaft and projecting into the groove, and a conduit for conducting sealing liquid to the groove.

15. The combination with a turbine casing having an opening and a rotatable shaft member horizontally disposed and projecting through the opening, of a rotary liquid sealing arrangement for sealing the rotatable member to the casing during rotation of the rotatable member as well as while said member is at rest, said arrangement comprising two elements having portions concentric with the rotatable member, means securing one of the elements to the rotatable member, and means including a motor for rotating the other element, means to seal the other element to the casing, and means to supply sealing liquid to the other element.

ORLA L. WOOD, JR.